United States Patent Office 2,807,426
Patented Sept. 24, 1957

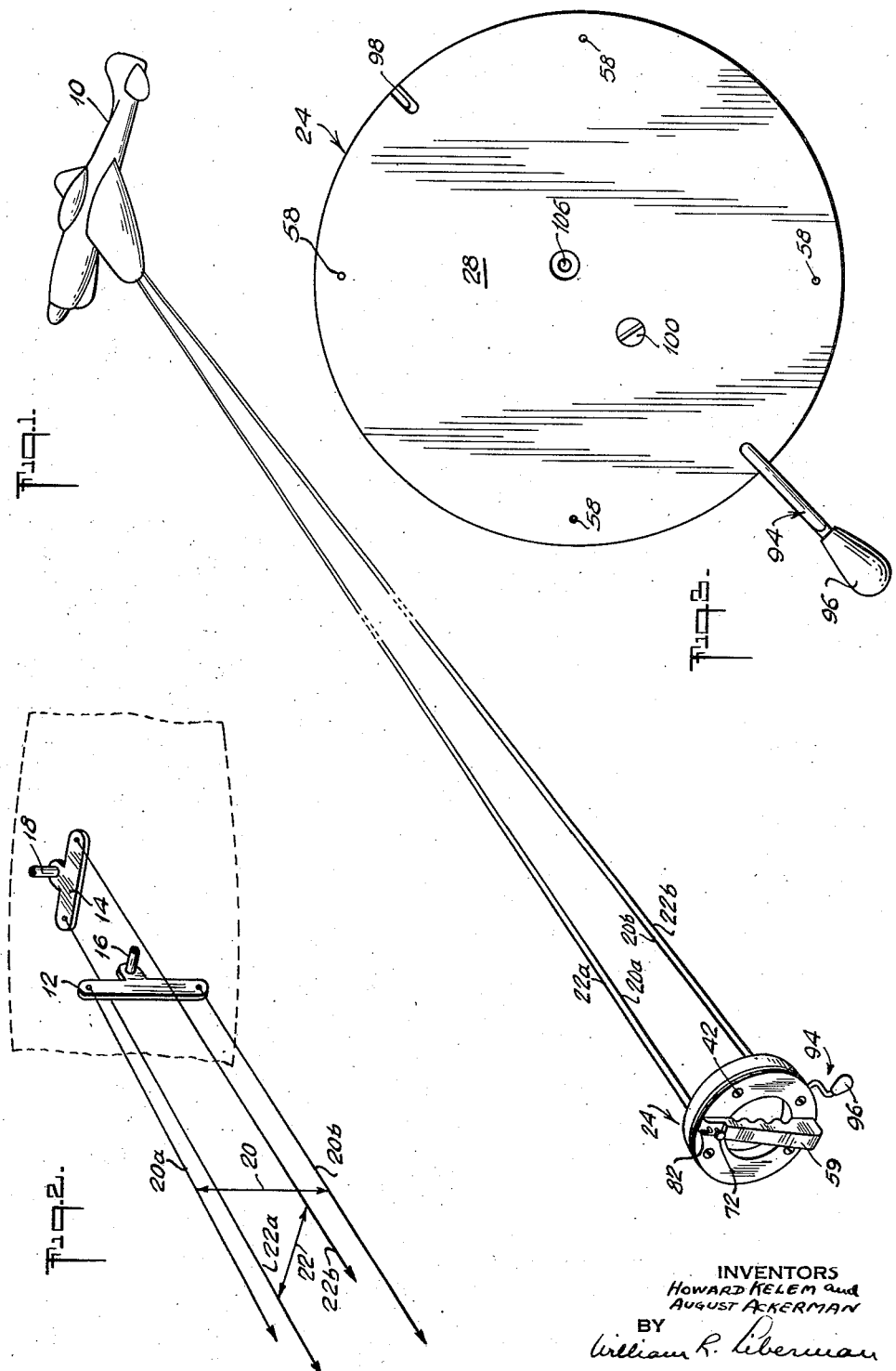

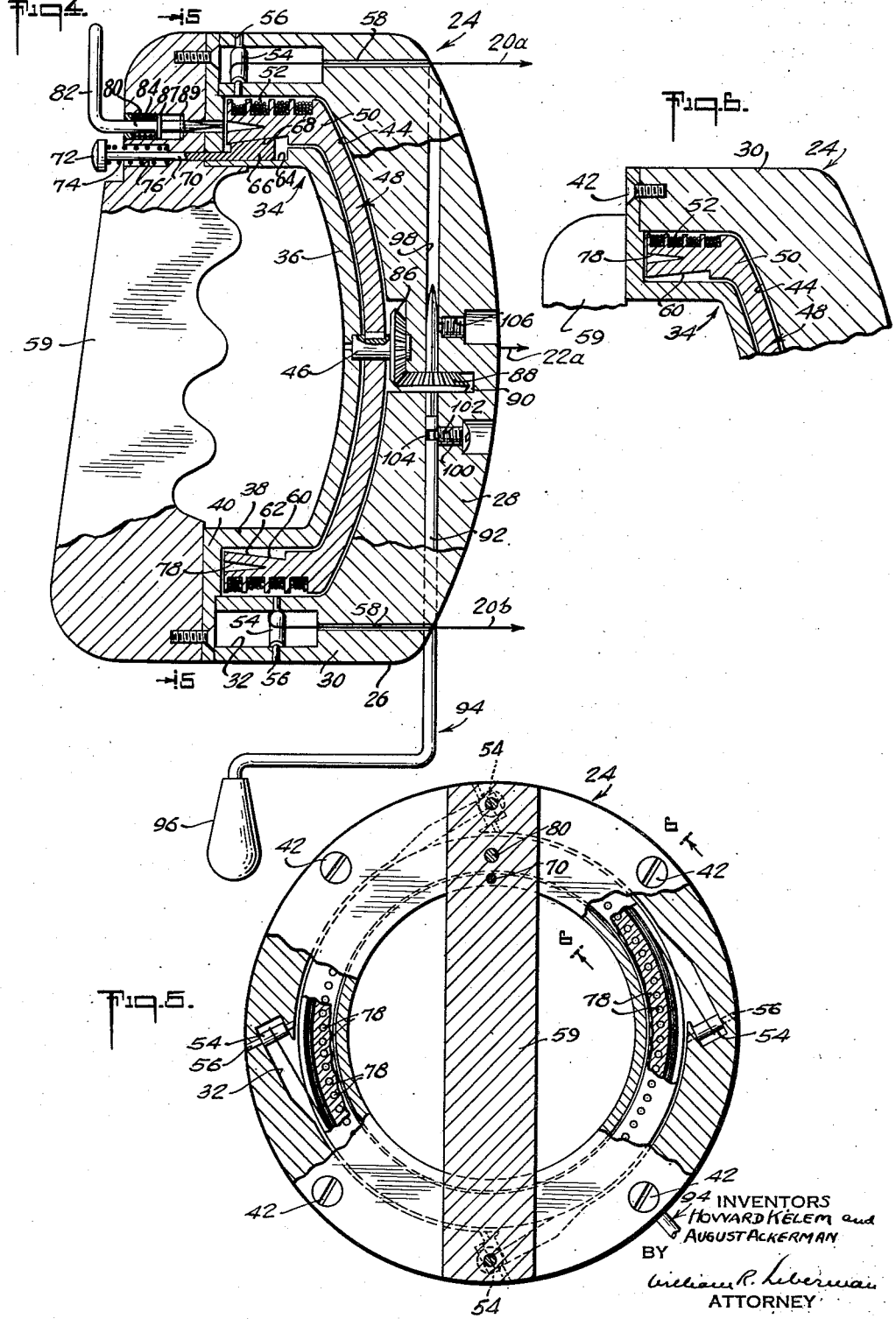

2,807,426

LINE STORAGE REEL

Howard Kelem, Far Rockaway, and August Ackerman, Brooklyn, N. Y.

Application December 28, 1953, Serial No. 400,434

6 Claims. (Cl. 242—100.1)

The present invention relates generally to an improved control apparatus for line-controlled mobile devices, and in particular it relates to an improved device for the line control of self-powered model aircraft or model surface craft. While not limited thereto, the present invention will be described in relation to its use in the control of captive model aircraft.

A popular pastime is the flying of self-powered model aircraft since such flying requires a limited amount of space and the aircraft can be always under the control of an operator, and can be caused thereby to perform many complex maneuvers. In accordance with the conventional practice, the captive model aircraft is generally controlled by varying the elevators, thereby varying the altitude of the aircraft. The elevators are controlled by means of a pair of transversely spaced, flexible control lines extending from a manual control element held by the operator to a lever control disposed in the aircraft. The lever is coupled to the elevators whereby a change in position of the lever results in a corresponding change in the raising or lowering of the elevators. Through this system, the operator, by shifting the relative longitudinal position of the control lever by the manipulation of the manual control element, may vary the angularity of the elevators and thereby control the path of flight of the captive aircraft. Employing this system, the model aircraft will traverse paths along the surface of a sphere with the operator at its center and of a radius substantially equal to the length of the control lines.

While, by proper manipulation of the manual control element, the aircraft can be caused to execute many complex flying patterns, flexibility and maneuverability are limited since the operator may control only one variable. Furthermore, mobile craft which require the simultaneous control of a plurality of variables cannot be properly or adequately maneuvered by means of the conventional line control systems. An outstanding example of such type of aircraft is the helicopter. It is thus apparent that the absence of more than one control of the captive flying aircraft leaves much to be desired and taxes the skill of the operator very little.

It is thus a principal object of the present invention to provide an improved control apparatus for line-controlled captive, self-powered model air and surface craft.

Still a further object of the present invention is to provide an improved manual control element and storage device for control lines employed with captive, self-powered mobile craft.

Another object of the present invention is to provide an improved manual control element and storage device for control lines employed with captive, self-powered mobile craft having a plurality of control elements in accordance with the present invention.

The above and further objects of the present invention will become apparent from a reading of the following specification taken in conjunction with the accompanying drawing wherein, Figure 1 is a perspective view of a preferred embodiment of the present invention as applied to the maneuvering of a line controlled self-powered captive model aircraft;

Figure 2 is a detail perspective view of the control elements located in the controlled aircraft;

Figure 3 is a front elevational view of the improved manual control and line storage device in accordance with the present invention;

Figure 4 is a side elevational view thereof partially in section;

Figure 5 is a sectional view taken along line 5—5 in Figure 4; and

Figure 6 is a sectional view taken along line 6—6 in Figure 5.

The present invention broadly contemplates the provision of a control apparatus for a mobile craft comprising a pair of controlled elements mounted rotatably about mutually oblique axes, a pair of laterally spaced control lines extending longitudinally from each of said elements, each of said lines having its lead ends secured to said element at opposite sides of its respective axis of rotation, and a control member, the trailing portions of each of said pairs of control lines being engaged by said control member at points spaced on mutually oblique transverse axes of said control member. Each of the controlled elements are in turn connected to a corresponding flight controlling mechanism of the mobile craft. Thus, by rocking the control member about a transverse axis oblique to the line joining the terminii of one of the respective control line pairs, the controlled element is correspondingly manipulated, as is the respective flight control mechanism. Where the axis of rotation coincides with the line joining the terminii of the other pair of control lines, there is no movement of the latter control lines, and hence movement results of only the first pair thus permitting independent manipulation of the controlled elements. However, where the axis of rotation does not coincide with the latter terminii joining line there results a simultaneous movement of the controlled elements. Little practice is needed to acquire the skill or feel necessary to manipulate the controlled elements in the desired manner to achieve a great variety of different maneuvers of the captive craft.

In accordance with a preferred embodiment of the present invention the controlled elements consist of a pair of levers mounted intermediate their ends upon laterally offset, mutually perpendicular shafts which actuate the desired craft controls. The ends of each pair of control lines engage opposite ends of each lever. The control device includes a heavy walled, cup-shaped body member supporting a co-axial shaft to which is keyed a cup-shaped drum or spool which is nested in the body member. A bevel gear is also keyed to the shaft and engages a matching bevel gear which is mounted on the shank of a crank extending transversely through the bottom wall of the shaft and terminating in a winding handle. Four regularly circumferentially spaced tangential recesses are formed in the inner face of the body member side wall and have idler rolls supported therein and communicating with the outer face of the spool which has four longitudinally spaced peripheral grooves formed therein. Longitudinal bores are formed in the base of each of the recesses and extend through the front face of the body member. A cup-shaped cap nests in and is spaced from the spool walls and is provided with a peripheral flange which is secured to the upper face of the body member and has mounted thereon a diametrically extending hand grip. The inner cylindrical face of the spool is forwardly and inwardly inclined, and a forwardly directed recess is formed in the outer face of the cap and engages a rearwardly tapered brake shoe having a rearwardly directed shank extending through the cap flange and hand grip and terminating in a knob. Spring means urge the brake rearwardly to lock the spool which may be released by pressing on the knob. A multiplicity of regularly circumferentially spaced, forwardly directed tapered holes are formed in the rear wall of the spool. A tapered pin is slidably disposed in a longitudinal bore formed in the handle and cap flange in line with the circumference of the tapered holes in the cap and terminates at its rear end in a finger piece and is spring urged forwardly. Thus the spool is positively locked in place when the pin engages any of the holes and the spool may be released by withdrawing the pin against the pressure of the spring. Each of the control lines may be stored by being wound in a corresponding groove in the spool by means of the winding handle. Each control line passes into a corresponding body member tangential recess, about the idler roll and through the body member front face by way of the longitudinal bores.

Reference is now made to the drawing which illustrates a preferred embodiment of the present invention wherein the numeral 10 generally designates a line controlled model airplane having two sets of controls. For example there may be controlled any of the following two, the elevators, motor speed, rudder, ailerons or any other desired variable or actuated device. Located in the craft 10 are a pair of controlled elements 12 and 14 rigidly mounted on shafts 16 and 18 and rotatable therewith. The shafts 16 and 18 extend in longitudinal and vertical directions respectively so that the controlled elements 12 and 14 are rotatable about mutually perpendicular, laterally spaced axes. The shafts 16 and 18 may be coupled to and control any desired control mechanism as aforesaid. Engaging the opposite ends of each of the control elements 12 and 14 is a pair of control lines 20 and 22 respectively, the pair 20 including a line 20a whose lead end engages the upper end of the controlled element 12 and a line 20b whose lead end engages the lower end of the controlled element 12, and the control line pair 22 including a line 22a and a line 22b engaging respectively the forward and rear end of the controlled element 14. Thus by proper manipulation of the pairs of lines 20 and 22 as aforesaid the desired controls may be effected. The necessary manipulation is accomplished by a control device 24 which also serves as a line storage device and which when in operation engages the trailing portions of the lines 20 and 22 to facilitate their control as will be hereinafter set forth.

The control device 24 includes a thick walled cup shaped body member 26 having an arcuate front wall 28 and a cylindrical peripheral wall 30. Four regularly circumferentially spaced tangentially extending recesses 32 are formed in the inner face of the cylindrical wall 30 and are open through the rear end of the wall 30.

A cup shaped cap member 34 having a front arcuate wall 36 and a cylindrical peripheral wall 38 registers with the interior of the body member 26 and is provided with an outwardly directed peripheral flange 40 which abuts the rear annular face of the body member 26 and is secured thereto by means of suitable screws 42. The confronting faces of the body member 26 and the cap member 34 are substantially uniformly spaced from each other and define a spool housing cavity 44.

A pair of aligned circular recesses are formed in the confronting faces of the body wall 28 and cap wall 36 co-axial with the longitudinal axis of the body member 26 and cap 34 and rotatably support a short shaft 46. A cup-shaped winding drum or spool 48 is located in the spool cavity 44 and is co-axially mounted on and suitably keyed to the shaft 46 by means of a longitudinally extending groove opening formed in the front wall of the spool 48 so that the spool 48 rotates with the shaft 46. As illustrated in the drawings, the faces of the spool 48 are spaced from the confronting faces of the spool cavity 44 in order to permit the relatively free rotation of the spool. The spool 48 is provided with a cylindrical peripheral wall 50 having four regular longitudinally spaced circumferential grooves 52 formed in its outer face which are adapted to store a corresponding number of control lines. Located adjacent the rear wall of each of the recesses 32 is a line guide consisting of an idler roll 54 suitably mounted on a transverse axle 56 supported between the walls of the corresponding recess 32. A longitudinal bore 58 is formed in the front wall of each of the recesses 32 and extends through the body member 26, the longitudinal axis of each bore being tangent to the inner face of the corresponding idler roll 54. Each of the idler rolls 54 is supported at a different level adjacent the respective spool storage grooves 52.

A hand grip 59 of suitable configuration is secured to the cap flange 40 and extends across and rearwardly thereof.

A peripheral groove 60 is formed in the inner face of the spool wall 50 and is defined by an outwardly and forwardly inclined surface 62 and a radial shoulder. A longitudinal recess 64 is formed in the outer face of the cap wall 38 at the level of the spool groove 60 and slidably houses a wedge-shaped brake shoe 66 having an inclined braking surface 68 confronting and parallel to the spool groove surface 62. The brake shoe 66 is provided with a rearwardly directed, rod-shaped shank 70 which extends through corresponding aligned longitudinal bores formed in the cap flange 40 and the upper part of the hand grip 59 and terminates in a finger knob 72. A helical compression spring 74 engages the shank 70, is disposed in a recess 76 formed in the hand grip 58 and is entrapped between the under face of the knob 72 and the inner shoulder of the recess 76 to normally urge the shank 70 and brake shoe 66 rearwardly, whereby to bring the braking surface 68 into tight engagement with the spool surface 62 to retard or halt the rotation of the spool 48. Furthermore, in order to lock the spool 48 positively in any desired position a multiplicity of closely-spaced, longitudinal tapered depressions 78 are formed in the rear end face of the spool wall 50. A tapered pin 80 terminating in a finger piece 82 is slidably supported in a bore formed in the cap flange 40 and the hand grip 58 so as to be movable into and out of engagement with a selected hole 78. A helical compression spring 84 surrounding the pin 80 and nested in a recess in the hand grip 59 is entrapped between an annular flange 87 supported on the pin 80 and a bushing located in said recess to urge the pin 80 forwardly into engagement with a hole 78. A transverse pin 89 is mounted on the pin 80 forward of the annular flange 87 and selectively registers with a pair of grooves formed in the opposite walls of the opening engaging the forward portion of the pin 80 or rests on the shoulder between the recess 76 and said opening to define lock and unlock positions respectively. In order to permit rotation of the spool 48 for winding or unwinding it is necessary to raise the pin 80 and at least partially depress the brake shoe 66 by way of the knob 72.

The mechanism for rotating the spool 48 includes a first bevel gear 86 secured to the shaft 46 and located in a recess formed in the body wall 28 and a second matching bevel gear 88 engaging the first gear 86 and located in a recess 90 formed on the wall 28. The gear 88 is engaged and rotatable by the shank 92 of a crank 94 which terminates in a hand portion 96. The crank shank 92 extends through a transverse bore 98 formed in the body wall 28 and is locked against sliding movement by means of a set screw 100 engaging a tapped hole 102 in the wall 28 communicating with the bore 98 and registering with a peripheral groove 104 formed in the crank shank 92. In order to permit the locating of the handle on the opposite side of the device 25 to accommodate right handed or left handed operators, a second tapped hole 106 is provided opposite to the hole 102.

Considering now the operation of the improved control device 24, the device may be initially laced up or threaded by removing the cap member 34 and lifting the spool 48 from the shaft 46. An individual control line is secured to and wound in each of the spool grooves 52, the lead ends of the lines being carried into corresponding recesses 32 about respective idler rolls 54 and forwardly through the bores 58. The device is then reassembled and is ready for use, the lead ends of the lines being preferably provided with any well known detachable fastening means. The ends of a pair of control lines guided through diametrically opposed bores 58 are secured to opposite ends of the controlled lever 12 and define lines 20a and 20b and the ends of the control lines passing through the other pair of bores 58 are secured to opposite ends of the controlled lever 14 and define lines 22a and 22b. The craft 10 is then carried from the control device 24 for the desired distance, the brake 66 being depressed and the pin 80 raised to unlock position to permit the rotation of the spool and proper withdrawal of the control lines and being released and returned to lock position respectively when the craft has been located the desired distance from the control device 24. The brake 66 is so manipulated as to retard the rotation of the spool 48 to a degree sufficient to prevent back lash and to allow the uniform withdrawal of the lines. In manipulating the controls, the control device 24 is held by the operator so that the lines 20a and 20b are vertically spaced and the lines 22a and 22b are horizontal spaced. In order to manipulate the controlled element 12 without moving the element 14 he merely rotates the device 24 about its horizontal transverse axis. This will result in a retraction of either line 20a or 20b as the case may be and a corresponding movement of the element 12. However, no relative movement of the lines 22a and 22b is effected and hence no movement of the controlled element 14. Similarly, rotation of the control device 24 about its vertical transverse axis will effect movement of the controlled element 14 without movement of the element 12. However, by rotating the control device 24 about an inclined transverse axis, movement of both controlled elements 12 and 14 is effected, their sense of movement and the relative degree of movement depending upon the inclination of the axis of rotation of the control device 24 and the direction of rotation, as can be seen in Figures 1 and 2 of the drawings. In returning the lines to stored position, the pin 80 is raised, and the brake 66 depressed and the lines are wound in their respective grooves 52 by rotating the spool 48 by means of the crank 92 while maintaining the lines under suitable tension.

While there has been described and illustrated a preferred embodiment of the present invention it is apparent that numerous changes and omissions may be made without departing from the spirit thereof.

Having now described our invention what we claim and desire to secure by Letters Patent is:

1. A line control device of the character described comprising a cup shaped body member having a front wall and a cylindrical peripheral wall having a plurality of tangentially extending recesses formed in the inner face thereof, a cup shaped spool nested in said body member and rotatable about a longitudinal axis, said front wall having a plurality of circumferentially spaced longitudinally extending guide openings formed therein and communicating with the outer peripheral face of said spool by way of said recesses, means disposed in said recesses for guiding individual lines from said spool through said guide openings and means for rotating said spool.

2. A line control device in accordance with claim 1, including a cup shaped cap member registering with said spool and fastened to the peripheral wall of said body member and a hand grip secured to said cap and extending diametrically thereover.

3. A line control device in accordance with claim 2, wherein said spool has formed in its inner peripheral face a forwardly outwardly inclined circumferentially extending surface and said cap member has formed in its outer peripheral face a longitudinally extending recess confronting said inclined surface and there are included a wedge shaped brake shoe located in said recess and slidable between a brake and a release position, means for actuating said brake shoe and spring means urging said brake shoe to said brake position.

4. A line control device in accordance with claim 1, wherein a plurality of longitudinally spaced peripheral grooves are formed in the outer face of said spool and said individual line guide means are disposed in said recesses at substantially the levels of said respective grooves.

5. A line control device in accordance with claim 1, wherein braking means are provided to retard the rotation of said spool.

6. A line control device of the character described, comprising a cap shaped body member having a front face and a rearwardly directed peripheral wall, a spool nested in said body member and rotatable about a longitudinal axis perpendicular to said front face, said spool having a plurality of longitudinally spaced peripheral grooves formed therein and said body member having a plurality of passageways formed therein, each of said passageways extending longitudinally and transversely from said front face along said peripheral wall to the level of a respective groove.

References Cited in the file of this patent
UNITED STATES PATENTS

| | | |
|---|---|---|
| 2,061,953 | Sampson | Nov. 24, 1936 |
| 2,344,490 | Brach | Mar. 21, 1944 |
| 2,406,874 | Walker | Sept. 3, 1946 |
| 2,601,409 | McArthur | June 24, 1952 |
| 2,659,999 | Turner | Nov. 24, 1953 |